United States Patent
Keller et al.

(10) Patent No.: US 8,373,803 B2
(45) Date of Patent: Feb. 12, 2013

(54) MULTISTANDARD RECEIVER CIRCUIT FOR ANALOGUE AND DIGITAL BROADCASTING

(75) Inventors: Stefan Keller, Freiburg (DE); Hans Stoorvogel, Malden (NL); Erik Venema, Ommen (NL)

(73) Assignee: Entropic Communications, Inc., San Diego, CA (US)

( * ) Notice: Subject to any disclaimer, the term of this patent is extended or adjusted under 35 U.S.C. 154(b) by 0 days.

(21) Appl. No.: 12/670,121

(22) PCT Filed: Jul. 25, 2008

(86) PCT No.: PCT/EP2008/006164
§ 371 (c)(1),
(2), (4) Date: Apr. 13, 2011

(87) PCT Pub. No.: WO2009/013015
PCT Pub. Date: Jan. 29, 2009

(65) Prior Publication Data
US 2011/0187938 A1 Aug. 4, 2011

(30) Foreign Application Priority Data
Jul. 26, 2007 (DE) .......................... 10 2007 035 524

(51) Int. Cl.
*H04N 5/445* (2011.01)
*H04N 5/46* (2006.01)

(52) U.S. Cl. .......................... 348/726; 348/725; 348/555

(58) Field of Classification Search .......... 348/553–558, 348/725–731
See application file for complete search history.

(56) References Cited

U.S. PATENT DOCUMENTS

| | | | |
|---|---|---|---|
| 5,659,313 A * | 8/1997 | Dischert et al. | 341/132 |
| 5,717,471 A | 2/1998 | Stewart | |
| 6,005,640 A | 12/1999 | Strolle | |
| 6,369,857 B1 | 4/2002 | Balaban | |
| 6,668,027 B1 * | 12/2003 | Scarpa | 375/345 |
| 6,862,325 B2 | 3/2005 | Gay-Bellile et al. | |
| 7,075,585 B2 * | 7/2006 | Favrat et al. | 348/554 |

FOREIGN PATENT DOCUMENTS

| | | |
|---|---|---|
| CA | 2 310 183 | 10/1995 |
| EP | 0 696 854 A | 2/1996 |
| EP | 0 939 556 A | 9/1999 |
| EP | 1 085 664 A2 | 3/2001 |
| KR | 1020030077204 A | 10/2003 |
| KR | 1020060014606 A | 2/2006 |

(Continued)

OTHER PUBLICATIONS

PCT Search Report and Written Opinion corresponding to the related PCT Patent Application No. EP2008/006164 mailed on Mar. 31, 2010.

Hafemeister, "An Advanced Receiver Architecture for Global Terrestrial TV Reception for Automotive & Mobile Applications," IEEE 2006, pp. 429-430.

(Continued)

*Primary Examiner* — Michael Lee

(57) ABSTRACT

The invention relates to a multistandard receiver circuit for analogue and digital broadcasting, particularly analogue and digital television broadcasting, having a demodulator arrangement with an input for applying digital or digitized values (d) for both analogue and digital broadcasting signals from a tuner (1) and with components and/or an algorithm for processing the values (d). Emphasis should be given to an embodiment and/or controller for processing the values (d) for all processing steps which are to be performed in the field of intermediate-frequency processing with shared components.

17 Claims, 1 Drawing Sheet

FOREIGN PATENT DOCUMENTS

Figure 1:
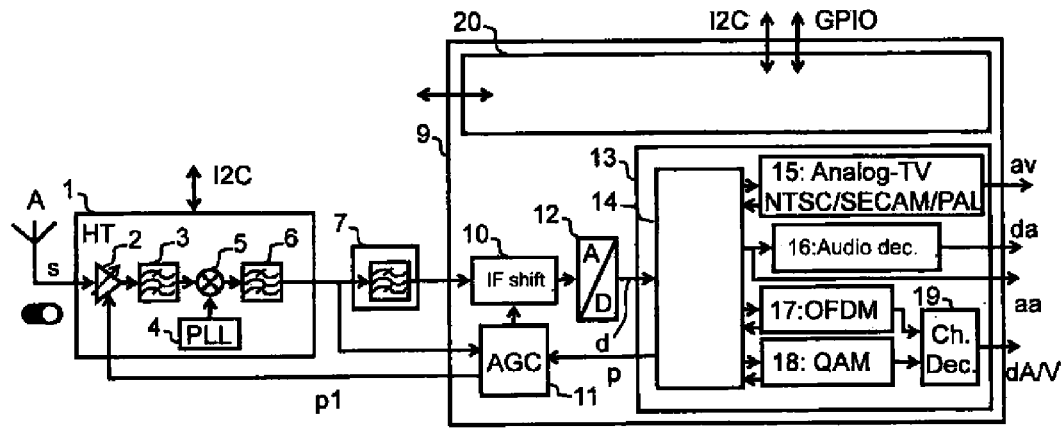

| | | |
|---|---|---|
| WO | 99/46931 A | 9/1999 |
| WO | 2005/009033 A1 | 1/2005 |
| WO | 2006/007073 A | 1/2006 |
| WO | 2006/007073 A1 | 1/2006 |

OTHER PUBLICATIONS

Micronas, Product Information "DRX 394yJ Single-Chip Multistandard Demodulator", Jan. 2007.

* cited by examiner

MULTISTANDARD RECEIVER CIRCUIT FOR ANALOGUE AND DIGITAL BROADCASTING

The invention relates to a multistandard receiver circuit for analog and digital broadcast, in particular, analog and digital television broadcast, having the features in the preamble according to patent Claim 1, and to a method for receiving analog and digital broadcast, in particular television broadcast.

The transmission of broadcast signals, including television broadcast signals, by means of an analog carrier signal is generally known. In recent years, digital broadcast has also been introduced, so that in many regions for at least a transition period, analog and digital broadcast signals can be received at a receiver location. Because the individual broadcast transmitters are being converted gradually, it is important for a receiver to be able to receive both signal types, digital and analog signals, in order to access all available broadcast. The transition from the various analog television standards and broadcast standards to the new digital standards has led to a transition scenario in which hybrid multistandard receivers having multistandard receiver circuits are necessary. New signal processing architectures have therefore been developed for receiving both analog and digital signals from various signal sources, such as terrestrial, cable-based, and satellite supported signal sources.

Here, there are two categories of multistandard receiver types. The patents WO2005/009033 A1, CA 2310183 C, U.S. Pat. No. 5,717,471 A, KR 10 2006 0014606 A, KR 10 2003 0077204 A, U.S. Pat. No. 6,369,857 B1 and U.S. Pat. No. 6,005,640 A describe receivers, comprising and using in common only a single tuner, SAW filter (SAW: surface acoustic wave), one IF amplifier IF: intermediate frequency) and one A/D converter (A/D: analog/digital) for the different receiver modes. However, subsequent demodulation cores and components are implemented completely independent of each other, so that after the conversion into a digital signal, separate processing branches are used for analog and digital signals. This makes the circuits very costly with respect to the number of components, duration of processing, and space requirements on the circuit board.

The U.S. Pat. No. 6,862,325 describes a receiver that is based on processor cores, common memory, etc., and that is completely programmable. Therefore, the entire hardware architecture is used in common for all receiver modes.

A further receiver architecture for global terrestrial television reception for automotive and mobile applications is known from "An advanced receiver architecture for global terrestrial TV reception for automotive & mobile applications", Hafemeister, T.; Weltersbach, W.; Consumer Electronics, 2006, ICCE apos; 06/2006, Digest of technical papers, International Conference on Volume, Issue, 7-11 Jan. 2006, pages 429-430.

Thus, all known documents describe inefficient, complicated, and expensive architectures. The implementation types are all suboptimal with respect to power consumption and use of the chip surface area and circuit board surface area, wherein the processing for different receiver modes would offer great potential for synergy, but said potential is not utilized in separate or completely programmable implementations.

The object of the invention is to provide a multistandard receiver circuit for analog and digital broadcast, in particular, television broadcast, particularly requiring less chip surface area or circuit board surface area. In addition, a corresponding method for receiving analog and digital broadcast is provided.

The object is solved by a multistandard receiver circuit for analog and digital broadcast, in particular television broadcast, having the features according to patent claim 1, and by a method for receiving analog and digital broadcast, in particular television broadcast, having the features according to patent claim 15. Advantageous embodiments are the subject matter of dependent claims.

According to the invention, a multistandard receiver circuit for analog and digital broadcast, in particular, analog and digital television broadcast, preferably has a demodulator arrangement having an input for connecting digital or digitized values, and analog as well as digital broadcast signals from a tuner, having components and/or an algorithm for processing the values, and having an arrangement and/or controller for processing the values for all processing steps to be performed in the range of intermediate frequency processing using common components.

In other words, digitized values from different broadcast signal sources, in particular using different broadcast standards, can be processed in common, insofar as processing in the range of the intermediate frequency is necessary or expedient. Ultimately, common data processing of the data and signals from different sources is possible beyond the tuner, the SAW filter, an IF amplifier and the A/D converter, even in the range of the intermediate frequency processing steps.

Preferably, there is an analog/digital compensation device, which is designed for linearizing digital or digitized values.

Interference effects arising from the digitization in the A/D converter can thereby be removed. Interference-suppressed data, above all, can thereby be provided for further processing for determining a power or automatic gain control (ATG) signal for power and clipping adjustment having sufficiently low interference.

Preferably, a power- and/or clipping measurement device for providing a power signal to an AGC device is designed or controlled for providing a gain signal. Preferably in addition, the gain signal provided from the AGC device is applied to an amplifier, located in the tuner, as a gain factor for amplifying a received signal.

The gain signal provided by the AGC device is preferably applied to an intermediate frequency amplifier as a gain factor for amplifying a signal to be applied subsequently at an analog/digital converter.

A demodulation device serves to demodulate the digital or digitized values, or values created froth them through further processing, onto the baseband, depending on a frequency offset applied to the demodulation device, and is equipped with a selector switch for selecting the frequency offset from various frequency offsets of various dedicated broadcast signal processing processors of the various processing standards, connected downstream of the demodulation device. A frequency shift device serves to shift the digital or digitized values previously modulated onto the baseband, depending on a frequency offset applied to the frequency shift device, and is equipped with a selector switch for selecting the frequency offset from various frequency offsets of the various dedicated broadcast signal processing processors of various processing standards, connected downstream of the frequency shift device.

A sample rate converter device serves to sample the digital or digitized values previously modulated onto the baseband, depending on a time offset applied to the sample rate converter device, and uses a selector switch to select the applied time offset from various applied time offsets of various dedicated broadcast signal processing processors of various processing standards, connected downstream of the sample rate converter device.

Preferably, a circuit having one or more filter devices for filtering the digital or digitized values previously modulated onto the baseband into a channel filtered digital complex baseband, wherein the filter devices are designed or controlled for using coefficients corresponding to a Hilbert filter implementation for analog standards, and/or a Nyquist filter implementation for digital standards.

Here, complex is understood to be complex value variables, i.e., a quadrature, or real, component and an imaginary component of the signal or the values. The Nyquist and/or Hilbert filters are preferably flexibly programmable, in order to be able to support differing modes, bandwidths, roll-off factors, etc.

The analog/digital compensation device, the power and/or clipping measurement device, the demodulation device having the selector switch for selecting the frequency offset, the frequency shift device having the selector switch for selecting the frequency offset, the sample rate converter device having the selector switch for selecting the applied time offset, and/or the one or more filter devices for filtering the digital or digitized values, previously demodulated on the baseband, into a channel filtered digital complex baseband are preferably integrated together on a semiconductor or in a semiconductor housing.

Preferably, for providing a gain signal, a power signal from a power and clipping measurement device and also a signal connected after the tuner and before a SAW filter, are applied to a circuit with an automatic gain control device.

A gain signal of the automatic gain control device is also preferably applied as a gain factor to a circuit having an intermediate frequency amplifier connected ahead of an analog/digital converter. Insofar as the gain factors are specified, it is naturally apparent that, depending on the momentary value of the gain factor, said factors cause no modification, an actual amplification, or attenuation of the signal or value to be amplified.

A preferred circuit has a dedicated analog TV processor for final processing of digital and digitized values of a channel-filtered digital complex baseband, provided by upstream circuit components and or processing steps, wherein the analog TV processor is controlled and/or switched according to NTSC standard.

A dedicated analog TV processor serves for final processing of digital and digitized values of a channel-filtered digital complex baseband, provided by upstream circuit components and or processing steps, where the analog TV processor is controlled and/or switched according to the SECAM and/or PAL standard.

In a preferred independent process for receiving analog and digital broadcast, in particular television broadcast, digital and digitized values of analog as well as digital broadcast signals are provided and processed by a tuner, wherein the processing of the values for all processing steps to be carried out is carried out in common in the range of the intermediate frequency processing.

Data processing of data and/or signals of different standards using common process steps occurs for an analog/digital compensation, for a power and/or clipping measurement, for a demodulation onto the complex baseband using selection of a frequency offset of different downstream dedicated processors, for a frequency shift using selection of a frequency offset, for a sample rate conversion using a selection of the applied time offset, and/or for filtering of the digital or digitized values that have been previously demodulated onto the baseband, into a channel-filtered digital complex baseband.

A more efficient and cost effective architecture is provided by the multistandard receiver circuit or a receiver device having such a circuit. Power consumption and the chip surface area required can be reduced, wherein all expedient synergies are usable. The common signal processing path has been extended beyond the previous components throughout processing in the intermediate frequency. In other words, not only the tuner, the SAW filter, the IF amplifier and the A/D converter are used in common, but also, in the framework of the multistandard demodulator, additional components such as an A/D compensation, a demodulation, a sample rate conversion, and a filtering, in particular a Nyquist and/or Hilbert filtering.

In particular, a common digital demodulation circuit is provided that performs a down-mixing from the $2^{nd}$ intermediate frequency or a lower intermediate frequency (low-IF) into the complex baseband, performing a sample rate conversion, that is, performing a conversion from the free running analog digital conversion clock for a subsampling onto the symbol rate of a digital standard, and that performs a channel filtering to reduce or eliminate the neighboring channel interference. Preferably, such a demodulation circuit provides at its output, or its output connections, a complex baseband signal for further standards based specific processing.

It must be emphasized that such a hybrid demodulator approach for analog and additional digital standards places heavy demands on the analog input signal processing, in particular the linearity of the signals, or the data sequence of the A/D converter. Here, a common processing for analog as well as digital applications is only possible if the signal, that is, the data, reaches an interference-free dynamic range, which is usually called an SFDR (spurious-free dynamic range), so that the interference-free dynamic range of the signal is sufficiently large. In order to achieve this, the use of an A/D compensation of the A/D converter nonlinearities is advantageous. Preferably, all processing steps that are implemented in a flexible manner in the demodulation device, in the sample rate conversion device, and in the channel filter banks, are designed or programmed in order to support different intermediate frequencies, symbol rates, channel bandwidths, etc.

This advantageously enables significant reduction of the complexity. The same hardware platform can be used for all intermediate frequency demodulation steps and channel filtering. The same hardware infrastructure and/or the same software algorithms or processing procedure can also be optionally used for the AGC.

Figure 2:
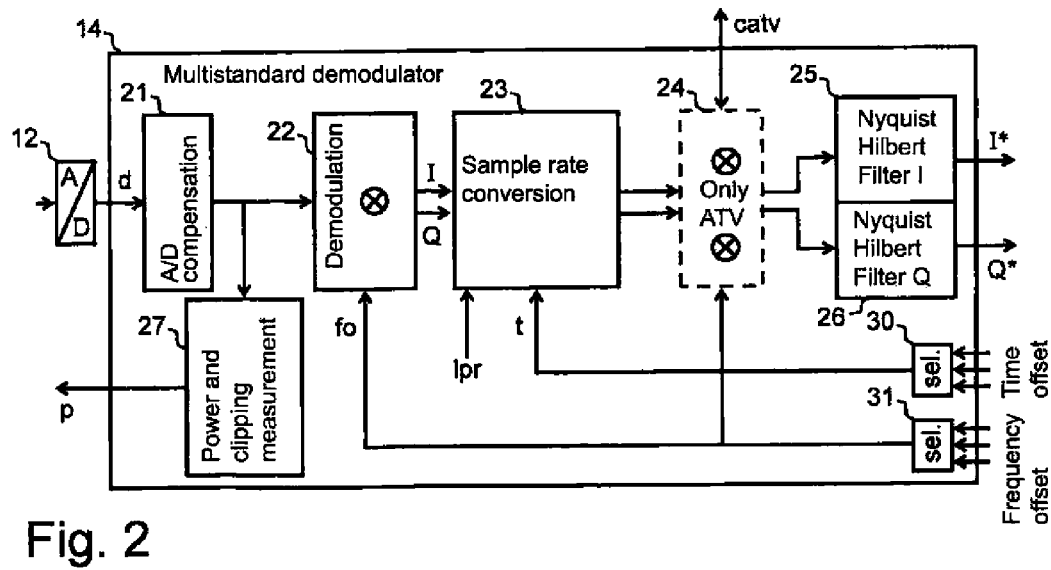

An exemplary embodiment of the invention is explained in more detail in the following using a drawing. Shown are:

FIG. 1 components of a multistandard receiver for analog and digital broadcast that can be used on a higher-level circuit board for processing received analog and digital broadcast signals, and FIG. 2 a multistandard demodulator used in FIG. 1 that can be used as a subcomponent in the circuit according to FIG. 1.

FIG. 1 shows an exemplary embodiment of a receiver circuit. A high-frequency signal is received through an input, for example, an antenna A. In addition, or as an alternative, such a received signal s can also be received through the input via cable or terrestrial broadcast transmitters, in particular, television transmitters. The received signals are fed from the input to a tuner 1, HT. The tuner 1 serves to down-convert the signal fed from the input to the intermediate frequency.

In the first stage of the tuner 1, a gain factor of the tuner 1 that is applied to the received signal s is set by means of an amplifier 2, using a gain signal pl as a high frequency AGC control signal provided by an AGC algorithm (AGC: automatic gain control) or by an AGC device 11. Preferably the gain factor can be used in common for all signal standards that are being processed by meanas of the multistandard receiver circuit. The tuner 1, which is built substantially in the known manner, optionally has, for the control thereof, a connection to a control bus I2C according to the I2C standard or another standard. The gain signal pl that is output by the amplifier 2 is fed into an arrangement of a band-pass filter 3, then to a mixer 5, and after output from the latter to a further band-pass filter 6, where an output signal of a phased locked loop 4, PLL is applied at the mixer 5.

An output signal of tuner 1, which is output from the further band-pass filter 6, is applied to a SAW filter 7 having an integrated filter 8, and also to the AGC device 11. Thus, the output signal of the tuner 1 is measured using a dedicated detector supplying corresponding information to the AGC device 11 regarding the signal power before the SAW filter. In addition, the output signal of the tuner 1 is filtered by a SAW filter 7 that limits the signal to the used bandwidth, and thus reduces the overall proportion of noise and interference as well the power of the neighboring channels. For an implementation according to a particularly preferred embodiment, only a single SAW filter 7 is required. Ideally, the bandwidth of the SAW filter can be switched, for example, between 7 and 8 MHz.

An intermediate frequency block 9 is connected downstream of the SAW filter 7. The signal connected ahead of the SAW filter 7 is applied to the AGC device 11, which generates the gain signal pl, and outputs the high frequency AGC control signal to the amplifier 2.

The signal output after the SAW filter 7 is applied to an intermediate frequency amplifier 10 that is also located in the intermediate frequency block 9. The filtered intermediate frequency signal is amplified by the intermediate frequency amplifier 10 implemented as a fixed or programmable intermediate frequency amplifier, and applied to an A/D converter 12 (AD: analog to digital). The A/D converter 12 creates a sequence of digital or digitized values d having a sampling frequency using undersampling or subsampling, except for low frequency intermediate frequency signals. A typical 10 bit converter can be used, for example, as the A/D converter 12. The sampling frequency is preferably free-running, and need not depend on the standard used, in particular, on the criterion of an analog or digital standard. Also, the sampling frequency need not be selected depending on the intermediate frequency and/or the signal bandwidth.

Except in the case where a low intermediate frequency is used, the subsampling behavior of the A/D converter 12 leads to down mixing onto a $2^{nd}$ intermediate frequency. If low intermediate frequencies are used, wherein a low intermediate frequency plus one half of the signal bandwidth is less than half of the sample rate, the subsampling is omitted.

The sequence of the data or values d that have been digitized by the A/D converter 12 is subsequently fed to a processing block for digitized data 13, and there applied to a multistandard demodulator 14, which is used in common as a demodulation step for all standards used. After performing various processing steps, at least one output signal in the form of a complex baseband I*, Q* is provided in the multistandard demodulator 14 from the digitized values d for individual dedicated processing units.

The individual dedicated processing units are, for example, an analog TV processor 15 (TV: television), that outputs an analog picture or video signal av. The analog TV processor can selectively perform signal processing according to one or more standards NTSC, SEGAM, or PAL.

As a further exemplary dedicated processing unit, an audio decoder 16 is represented that provides a digital audio signal da, for example for transmitting according to $I^2S$ (Inter-IC Sound), a bus for transmitting audio data between integrated circuits. In parallel to this, an unprocessed output signal having only the complex baseband I*, Q* can also be output directly. Here, an analog audio signal aa is preferably output as an audio intermediate frequency according to SIF (Sound IF).

As a further dedicated processing unit, for example, a digital TV processor 17 is represented in FIG. 1, carrying out signal processing according to the DVB-T standard (ETS 300744) using the modulation type OFDM (orthogonal frequency division multiplex). As a further dedicated processing unit, a digital TV processor 18 is represented in exemplary form that performs signal processing according to the DVB-C standard. In particular, OFDM (orthogonal frequency division multiplex) and QAM (quadrature amplitude modulation) can be used for the information transmission. Output signals of the two digital TV processors 17, 18 are preferably applied to a channel decoder 19, which outputs a digital combined audio/video signal dA/V as data according to TS (MPEG transport stream).

The intermediate frequency block 9 is preferably controlled by a control device 20. The control device 20 can communicate with additional parallel, superordinate or subordinate components of a receiver, via various circuits, buses, and or lines, e.g. as known via the $I^2C$ (Inter Integrated Circuit) and GPIO (general purpose input/output), and preferably assumes the control of all components and functions of the receiver circuit.

Thus, the channel decoding tasks are reprocessed for the digital standards by a common channel decoder unit, in particular by means of an internal/external deinterleaving, a folding decoder, or a Reed Solomon decoder.

FIG. 2 shows the components of such a multistandard demodulator 14 in exemplary form. The digitized values d of the A/D converter 12 are first applied to an A/D compensation device 21 used as an optional component, in order to achieve a sufficient linearity of the signal, or the digitized values d, of the A/D converter 12, according to the usual requirements for an interference-free dynamic range.

Then, the signals or values output from the A/D compensation device 21 are analyzed with regard to the mean power thereof and the occurrence of clipping events. This is performed by a power and clipping measurement device 27, which feeds a power signal p to the AGC device 11 for processing there together with the signal branched off before the SAW filter 7. In addition, the AGC device 11 outputs a corresponding control signal, or optionally the gain signal, to the intermediate frequency amplifier 10. The provisioning of the gain signal p by the power and clipping measurement device 2, and the further processing steps described in the preceding and below, can preferably be implemented alternatively either in hardware and/or in software.

In a further step following the A/D compensation device 21 and to which the digitized values d of the A/D compensation device 21 are applied, the signal, or the values d, are downconverted onto the complex baseband in a demodulation device 22. For this purpose the demodulation device 22 is designed as a digital down-converter. The demodulator used in the form of the demodulation device 22 preferably has a programmable intermediate frequency, and an input for the instantenous frequency offset fo provided by the dedicated demodulators of the processing units of the substandards. For the currently selected standard, the suitable correct input value of the suitable frequency offset fo is selected accordingly using a selector switch 31. As can be seen in FIG. 1, corresponding lines for applying a frequency offset and/or a time offset lead, for example, from the analog TV processor 15 and from the two digital TV processors 17, 18 back to the multistandard demodulator, where they are connected to the selector switch 31 for the frequency offset, and to a selector switch 30 for a time offset.

The demodulation device 22 provides a complex baseband I, Q for a sample rate conversion device 23. Then, the preferably programmable sample rate conversion device 23 performs a decimation from the sample rate of the A/D converter 12 to a lower processing rate. This can be switched, for example, by applying a signal for signaling a low processing rate lpr. With analog TV signals, either a free-running clock, such as 20, 25 MHz, or a line coupled clock that is coupled to a video conductor frequency, can be used. With digital video standards, the sample rate is decimated to the symbol rate, or to a multiple of the symbol rate. The decimation factor can, again, be programmed, wherein additionally, information about the time offset t, provided by the baseband demodulator through the further selector switch 30 for the time offset, is used.

For analog TV signals, after the sample rate conversion by the sample rate conversion device 23, the complex baseband is further shifted with respect to the frequency by means of a frequency shifting device 24. In addition, for exchanging control and processing signals catv, the frequency shifting device 24 communicates with the superordinate control device 20 (FIG. 1) for processing in the generally known manner. Again, the frequency shifting is programmable, and an additional frequency offset can be applied from the outside, and used, in the form of the frequency offset fo provided by the selector switch 31. Therefore, in the active mode of the frequency shifting device 24, the frequency offset fo can be corrected either in the first or in the second demodulation step. In contrast, for digital television and broadcast signals, the frequency offset fo of the selector switch 31 is applied for the frequency offset.

Finally, a channel filtering is performed on the data output from the sampling rage conversion device 23 of a digital broadcast or television signal, or on the data processed by the frequency shifting device 24, where, for example, a first Nyquist and/or Hilbert filter 25 is applied to the first signal component I of the complex baseband I, Q, and a second Nyquist and/or Hilbert filter 26 is applied to the second signal component Q. The two Nyquist and/or Hilbert filters 25, 26 correspondingly output a channel-filtered digital complex baseband I*, Q* having correspondingly processed digital signals. Here, coefficients according to a Hilbert filter implementation are used for analog standards. For digital standards, the filter structure is used to implement a Nyquist filter. Accordingly, the Nyquist and/or Hilbert filters 25, 26 can be programmed flexibly in order to support different modes, bandwidths, roll-off factors, etc.

The filtered output signal is then transmitted as the complex baseband I*, Q* to the further dedicated demodulators of the dedicated processing devices 15-18.

Such a multistandard receiver circuit for analog and digital broadcast is, according to initial experiments, suitable at least for processing received signals according to the DVB-T standards (ETS 300744, Nordig unified & DTG Performance requirements), according to the digital cable standard (ITU-T J.83, DVB-C), and the free analog standards PAL, SECAM and NTSC including the radio broadcast standards.

Alternative embodiments can, for example, have additional or fewer dedicated processing devices. For example, the analog TV processor 15 can be omitted entirely. Also, an implementation having additional or processing devices other than the exemplary dedicated processing devices for the named standards can be used.

Also, modifications regarding the sequence of the named components and/or their algorithmic implementation are possible.

In particular, various AGC configurations can be implemented.

Also, the sampling frequency does not need to be specified as fixed but can be variably adjustable, for example, for optimizing the power with respect to neighboring channels, depending on the respective intermediate frequency, or on the standard to be demodulated.

The invention claimed is:

1. A multistandard receiver for analog and digital television broadcasts, comprising:
 a demodulator having an input for receiving digital values of analog and digital broadcast signals from a tuner, said demodulator demodulating the digital values in an intermediate frequency processing range onto a baseband;
 a frequency shifting device for shifting the demodulated digital values depending on a frequency offset, and
 a selector switch for selecting the frequency offset from various frequency offsets of various dedicated broadcast signal processing processors of various processing standards connected downstream of the frequency shifting device.

2. The circuit according to claim 1, further comprising a compensation device for linearizing the digital values.

3. The circuit according to claim 2 further comprising a power and clipping measurement device for providing a power signal to an AGC device for providing a gain signal.

4. The circuit according to claim 3 wherein the tuner comprises an amplifier to which the gain signal is applied as a gain factor for amplifying a received signal.

5. The circuit according to claim 3 wherein the the gain signal is applied as a gain factor to an intermediate frequency amplifier for amplifying a signal subsequently to be applied to an analog-to-digital converter.

6. The circuit of claim 1 further comprising a demodulation device for demodulating the digital values and values created therefrom onto the baseband, depending on the frequency offset.

7. The circuit of claim 6 further comprising:
 a sample rate conversion device for sampling the demodulated digital values and values created therefrom on the baseband, depending on a time offset applied to the sample rate conversion device, and
 wherein a selector switch selects the time offset from various time offsets of various dedicated broadcast signal processing processors of various processing standards connected downstream of the sample rate conversion device.

8. The circuit of claim 6 further comprising one or more filter devices for filtering the digital values previously demodulated onto the baseband into a channel-filtered digital complex baseband, wherein the filter devices use coefficients according to a Hilbert filter implementation for analog standards and a Nyquist filter implementation for digital standards.

9. The circuit according to claim 1, further comprising a compensation device, a power and clipping measurement device, a selector switch for selecting a frequency offset, a frequency shifting device, a selector switch for selecting a frequency offset, a sample rate conversion device, a selector switch for selecting an applied time offset, and one or more filter devices for filtering digital values previously demodulated onto the baseband into a channel-filtered digital complex baseband integrated together on a semiconductor with the demodulator.

10. The circuit of claim 1, further comprising:
an automatic gain control device,
a power and clipping measurement device for producing a power signal,
and
a SAW filter,
wherein the power signal and a signal tapped after the tuner and before the SAW filter are applied to the automatic gain control device to provide an amplification signal.

11. The circuit of claim 10 further comprising an intermediate frequency amplifier connected upstream of an analog-to-digital converter, and to which a gain signal of the automatic gain control device is applied as a gain factor.

12. The circuit of claim 11, further comprising: a dedicated analog TV processor for final processing of digital values of a channel-filtered digital complex baseband that have been provided by upstream circuit components, wherein the analog TV processor is controlled according to an NTSC standard.

13. The circuit of claim 12 further comprising: a dedicated analog TV processor for final processing of digital values of a channel-filtered digital complex baseband that have been provided by upstream circuit components, wherein the analog TV processor is controlled according to a SECAM standard.

14. A method for receiving analog and digital television broadcasts containing digital values of analog and digital broadcast signals provided by a tuner, comprising:

demodulating the digital values onto a baseband in an intermediate frequency range;
frequency shifting the demodulated digital values, depending on a frequency offset applied to the frequency shifting device, and
selecting the frequency offset from various frequency offsets of various dedicated broadcast signal processing processors of various processing standards connected downstream of the frequency shifting device.

15. The method of claim 14 further comprising:
filtering the digital values previously demodulated onto the baseband into a channel-filtered digital complex baseband using coefficients according to a Hilbert filter implementation for analog standards and using a Nyquist filter implementation for digital standards.

16. The circuit according to claim 4 wherein the gain signal is applied as a gain factor to an intermediate frequency amplifier for amplifying a signal subsequently to be applied to an analog-to-digital converter.

17. The circuit of claim 1 further comprising a dedicated analog TV processor for final processing of digital values of a channel-filtered digital complex baseband that have been provided by upstream circuit components, wherein the analog TV processor is controlled according to a PAL standard.

* * * * *